United States Patent [19]

Fabreges

[11] 4,203,632
[45] May 20, 1980

[54] ELECTRONIC CONTROL CIRCUIT FOR AN ELECTROMAGNETIC DECELERATOR

[75] Inventor: Michel Fabreges, Annonay, France

[73] Assignee: Regie Nationale des Usines Renault, Boulogne-Billancourt, France

[21] Appl. No.: 913,102

[22] Filed: Jun. 6, 1978

[30] Foreign Application Priority Data

Jun. 9, 1977 [FR] France ............................... 77 17635

[51] Int. Cl.² .......................... B60T 8/02; B60T 8/18
[52] U.S. Cl. ................... 303/100; 180/282; 303/96
[58] Field of Search ............... 180/82 R, 105 E, 282; 235/92 FQ, 92 TC; 244/111; 246/182 R, 182 B, 182 C; 303/3, 20, 93–96, 100, DIG. 1

[56] References Cited

U.S. PATENT DOCUMENTS

| | | | |
|---|---|---|---|
| 3,398,993 | 8/1968 | Sarbach et al. | 303/100 X |
| 3,443,842 | 5/1969 | Pier | 303/100 X |
| 3,450,943 | 6/1969 | Burke et al. | 303/95 X |
| 3,500,190 | 3/1970 | Michon | 303/96 X |
| 3,520,575 | 7/1970 | Steigerwald | 303/100 X |
| 3,948,569 | 4/1976 | Gentet et al. | 303/100 |
| 4,058,346 | 11/1977 | Burckhardt | 303/100 X |
| 4,093,316 | 6/1978 | Reinecke | 303/100 |
| 4,131,325 | 12/1978 | Bayliss | 303/93 |

Primary Examiner—Trygve M. Blix
Assistant Examiner—Reinhard J. Eisenzopf
Attorney, Agent, or Firm—Oblon, Fisher, Spivak, McClelland & Maier

[57] ABSTRACT

An electrical decelerator for heavy vehicles, such as road transport vehicles or motor coaches, wherein a manually generated brake command signal is converted to an electrical signal and combined with other parametric signals indicative of vehicle performance to derive a composite deceleration signal applied to later control and power stages. A computer is provided to combine the output signals from various vehicle sensors, including signals indicative of pneumatic brake pressure, vehicle loading, vehicle speed, and relative rotational speed between front and rear vehicle wheels.

4 Claims, 2 Drawing Figures

ELECTRONIC CONTROL CIRCUIT FOR AN ELECTROMAGNETIC DECELERATOR

BACKGROUND OF THE INVENTION

1. Field of the Invention

The present invention relates to improvements to the supply circuit of an electrical decelerator for heavy vehicles such as road transport vehicles or motor coaches.

2. Description of the Prior Art

"TELMA" electrical decelerators installed in many commercial vehicles of medium and large tonnage, touring and grand touring motor coaches, are well known to users. A documented article on these decelerators has been published in the technical review "Le poids lourd" ["The Truck"] October 1970, pages 79 to 88.

The Telma electrical equipment comprises a box of relay switches connected by a bundle of heavy cables to the decelerator and by a bundle of four fine wires to a control device. This box contains four breaking relays corresponding to four positions which are obtained by the successive excitation of four identical independent circuits mounted on the decelerator. Depending on the use of the vehicle, the control can be manual, mechanical or pneumatic. The braking is controlled by a lever mounted on the steering column like that for controlling the lights. The lever has five-positions with an off-position and four steps of increasing braking power. The control system, which is thus a fiveposition switch, can be actuated either manually or by the main brake pedal. It activates in succession four power relays which each supply two windings of the decelerator.

The major drawback of the existing system is that its actuation is not progressive but leads quite to the contrary to sharp variations in the braking torque. Measurements on a (TELMA) decelerator of the FOCAL 115 type, 28 volts at 1000 RPM, have yielded the following braking torque date.

1st contact: 22 mda N
2nd contact: 52 mda N
3rd contact: 81 mda N
4th contact: 118 mda N The existing electrical decelerator has no regulation, since this function must be provided by the driver. This fact makes it difficult to couple the decelerator with the main brake on a motor coach and makes driving particularly tiresome.

On the other hand, this actuation following driver action risks the application of too great braking forces and can lead to loss of traction at the rear (AR) at low braking levels (empty vehicle, slippery road). Since the decelerator acts only on two wheels. This actuation is always too great in the case of foot command (successive actuation of four relays, then pneumatic braking); the pneumatic braking being insufficient in itself to exploit the full traction of the AR axle.

In view of the fact that road-transport vehicles are subject to norms concerning equitraction, the control of the decelerator by the brake pedal becomes impossible. The drive must therefore make use of a supplementary device.

SUMMARY OF THE INVENTION

The present invention enables the avoidance of these drawbacks discussed above.

According to the present invention the intensity of the electric current delivered to the decelerator is regulated in a continuous manner as a result of the interposition of an electronic chopper of continuous current in the supply channel.

According to one embodiment of the invention the chopper comprises two successive stages: a control stage and a power stage. The control stage has an oscillator for supplying suitable command signals to the power stage for triggering the switching of conductor elements in the power stage. The power stage which consists either of power transistors or of a thyristor switching circuit, delivers rectangular pulses of full voltage variable in width at fixed frequency or constant in width at variable frequency or variable in both width and frequency.

According to another embodiment of the invention the control circuit for the intensity of the electric current feeding the decelerator has input detectors furnishing information concering the essential vehicle parameters to a computer which generates a variable control voltage for the chopper control stage as a function of the values of these different parameters, notably: a tachometric detector informing the computer of the vehicle speed; a pressure sensor in the braking system; a sensor informing the computer of vehicle loading and a detector of the differential rotation between the AV (front) and AR (rear) wheels of the vehicle.

The computer of the control circuit for the amplitude of electric current supplied to the decelerator is advantageously connected via a supplementary input to a control potentiometer actuated by the driver of the vehicle by means of the brake pedal when using the decelerator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
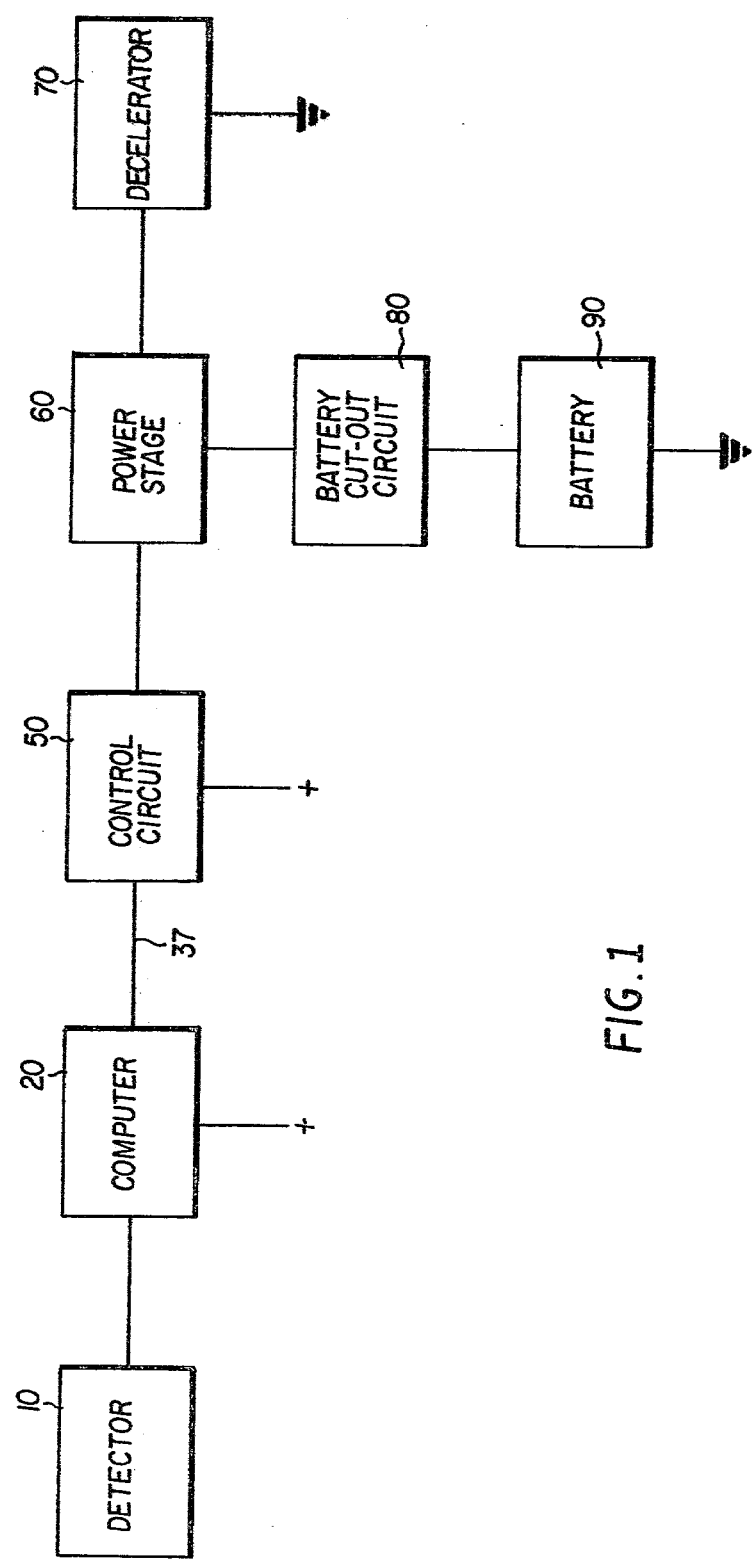
FIG. 1 is a block diagram of the electronic control system of a decelerator according to the present invention.

Referring now to the drawings, wherein like reference numerals designate identical or corresponding parts throughout the several views, and more particularly to FIG. 1 thereof, there is seen a diagram of the principle of the new installation according to the invention which includes a detector 10 for supplying information to a computer 20. This representation is symbolic and there will be singled out below with the aid of FIG. 2 the different sensors charged with furnishing to the computer 20 the information concerning the essential parameters of the vehicle, namely: its loading; its speed; the speed of its AV and AR wheels; and a command at the disposition of the driver of the vehicle. As a function of the values of the different parameter inputs, the computer 20 develops an output voltage equal to the command voltage given by the driver, or less than this command voltage if the a calculation, based on other parameters, indicates the necessity of reducing it in order not to compromise the stability of the vehicle; this output voltage serving to pilot a control circuit 50 consisting of an oscillator which generates appropriate control signals for a power stage 60 in the form of a chopper which is either of a type using power transistors or a thyristor switching circuit. The chopper 60 is connected in addition to the positive terminal of a battery 90 through a battery cut-out circuit 80. The output of the chopper power stage 60 is connected to the decelerator 70.

It is not necessary to describe in detail all the elements of FIG. 1, since most of them are commercial devices. With respect to the decelerator 70, it may be, for example, a TELMA decelerator of type FOCAL 115, 28 volts.

The power stage 60 of the chopper may be constructed of power transistors: In this case use can be made of the "TRACTIVAR" grade manufactured by TELEMECANIQUE. On the other hand a switching circuit with thyristors of the type MC 150 manufactured and sold in the United States by SEVCON may be used.

The control stage 50, as has been said, consists of an oscillator which delivers appropriate command signals to the power stage 60 and thus triggers the switching of the conductor elements, thyristors or transistors as the case may be. This control stage 50 creates at the output of the power stage 60 full voltage rectangular pulses of variable width at fixed frequency or of fixed width at variable frequency or of variable width and frequency. The frequencies utilized will be 50–200 Hz in the case of the SEVCON system with variable width and frequency, and 600 Hz in the case of the TRACTIVAR system with fixed frequency and variable width.

Figure 2:
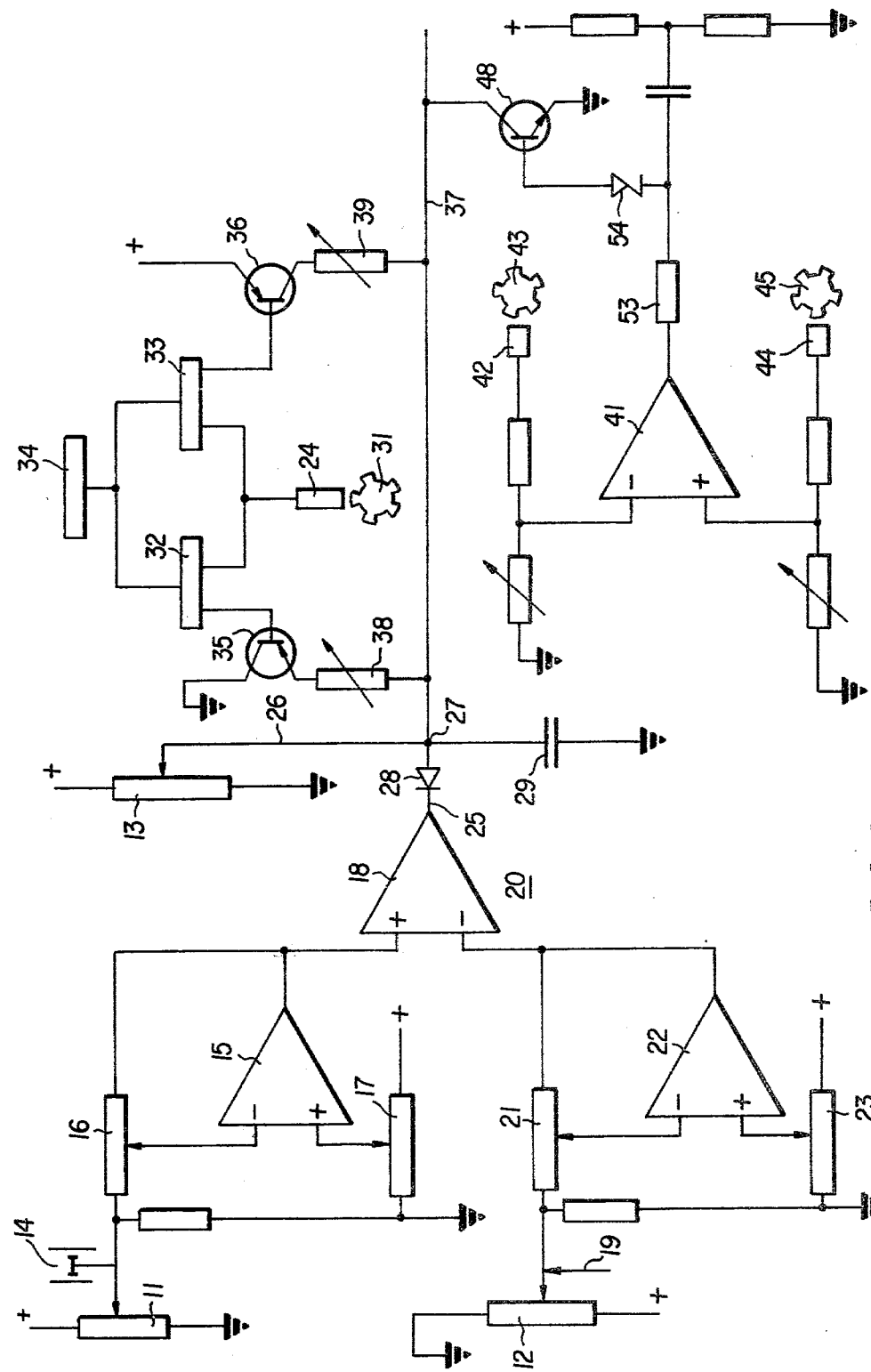
FIG. 2 is a detailed diagram of one embodiment of the computer in the electronic system of FIG. 1.

FIG. 2 illustrates an embodiment of the computer 20 of the invention. This computer has three information sensors illustrated in the form of potentiometric detectors 11, 12, 13. The first sensor 11 represented in the form of an adjustable potentiometer is a detector of the force exerted by the main brake. It constitutes a potentiometric detector of pressure. In particular, the position of the movable arm of potentiometer 11 is adjusted by the pressure prevailing within the pneumatic braking system 14. The signal furnished by potentiometer 11 is delivered to the inverting input of an operational amplifier 15 via a first adjustable potentiometer 16. The noninverting input of the same operational amplifier 15 is biased at a fixed voltage set by the intermediary of a second adjustable potentiometer 17 permitting adjustment of the output level of the operational amplifier 15. The potentiometers 16 and 17 adjust the gain and the signal level across the stage constituted by the operational amplifier 15.

The second sensor 12 represented in the form of an adjustable potentiometer is a detector of the loading of which vehicle, the loading acts at 19 to modify the position of the movable arm of potentiometer 12. The signal furnished by potentiometer 12 which is obtained either by a pressure sensor in the case of a pneumatic suspension or by a position sensor in the case of a spring suspension is sent to the inverting input of a second operational amplifier 22 via a first potentiometer 21 with adjustable pick off. The noninverting input of the same second operational amplifier 22 is biased to a fixed voltage set by a second potentiometer 23 so as to adjust the output level of the operational amplifier 22. The signals at the outputs of stages 15 and 22 are applied to the noninverting and inverting inputs, respectively, of a third operational amplifier 18 which delivers at its output 25 a voltage which is proportional to the loading 19 of the vehicle and inversely proportional to force furnished by the main brake 14. This voltage at the output 25 represents the upper limit for the command to the chopper 50-60.

The third sensor 13 represented in the form of an adjustable potentiometer illustrates the fact that the control switching activated by the driver of the vehicle is connected, according to the invention, to the computer 20 via an input 26. The variable takeoff of the potentiometer 13 is controlled then by the vehicle driver when he operates the main brake pedal. The voltage delivered by the potentiometer 13 activated by the main brake pedal constitutes the command voltage for the control stage 50, this value being limited by the computer channel described above, the output of which appears in the form of a maximum potential at the point 25, a capacitor 29 being provided to obtain a damped variation of the computer output voltage.

An inductive proximity detector 24 cooperating with position-reference means tied to the rotating element driven by the vehicle engine, as for instance the flange bolts 31 at the output of the vehicle gear box (not shown), in forms the computer of the vehicle speed. The output of the proximity detector 24 is connected in parallel to two frequency threshold detectors 32 and 33 connected via a second input to a clock 34. These threshold detectors 32 and 33 are connected at their output to the output line 37 of the computer through the transistors 35 and 36 and the respective adjustable resistances 38 and 39.

The frequency threshold detector 32 associated with the transistor 35 and resistor 38 constitutes a low-frequency cut-off circuit. Below a minimal vehicle speed the transistor 35 causes cancellation of the control voltage along a ramp time function. Conversely, the frequency-threshold detector 33 associated with the transistor 36 and resistor 39 constitutes a detector circuit for maximum vehicle speed above which the decelerator 70 is automatically and progressively activated for reasons of safety in order to limit vehicle speed.

In order to eliminate the possibility of slippage of the rear axle on a slippery road, the computer 20 also checks the speeds of rotation of a front wheel 45 and a rear wheel 43 of the vehicle by means of two inductive proximity sensors 44 and 42, respectively. Each of these sensors produces an excitation of opposite sign for a fourth operational amplifier 41 the output of which is tied to the output line 37 of the computer 20 via the series connection of a resistor 53, a Zener diode 54 and a transistor 48. If the rear wheel 43 turns more slowly than the front wheel 45, the transistor 48 turns on: shunts a portion of the output current of the computer 20 and permits the reduction of the excitation of the decelerator 70.

Obviously, numerous (additional) modifications and variations of the present invention are possible in light of the above teachings. It is therefore to be understood that within the scope of the appended claims, the invention may be practiced otherwise than as specifically described herein.

I claim:

1. A circuit for the control of the amplitude of the electric current feeding a decelerator associated with a vehicle having a pressurized brake system with a brake pedal, comprising:

a power stage connected to said decelerator for driving said decelerator;

a control stage in series connection to said power stage for supplying command signals to said power stage and for triggering said power stage in accordance with a deceleration signal applied to said control stage;

a computer connected to said control stage for generating said deceleration signal based on the values of different vehicle parameters, said computer comprising, first means for producing a first braking signal indicative of the manual application of braking to said vehicle, said first means including a command potentiometer activated by said brake pedal;

second means for producing second braking signals indicative of vehicle speed and for reducing said first braking signal when said vehicle speed is less than a predetermined value and increasing said first braking signal when said vehicle speed exceeds a predetermined value, said second means including a tachometric sensor; said tachometric sensor including an inductive proximity detector;

third means for producing a third braking signal indicative of brake system pressure and vehicle loading, said third braking signal combined with said first braking signal to limit the amplitude thereof; said third means including a brake pressure loading sensor and a vehicle loading sensor; and, fourth means for producing a fourth braking signal indicative of the relative rotation speed between the front wheel and the rear wheel of the vehicle, said fourth braking signal combined with said first braking signal to reduce said first braking signal in accordance with the relative rotation speed between the front and rear wheels, said fourth means including a sensor for detecting rotation speed of the front wheels, and a sensor for detecting the rotation speed of the rear wheels;

said fourth means being comprised of a common clock and a pair of frequency threshold circuits for comparing the output of said inductive proximity detector with the output of said common clock, thereby producing said second braking signals;

wherein said deceleration signal is formed by the combination of said first, second, third and fourth signals and thereby is based on the values of the vehicle parameters respectively associated therewith.

2. A circuit as in claim 1, wherein said power stage comprises: a continuous current electronic chopper, delivering full-voltage rectangular pulses of variable width at fixed frequency or of fixed width at variable frequency or of variable width and frequency.

3. A circuit as in claim 2, wherein said computer comprises:

a first operational amplifier amplifying the output signal of the brake pressure loading sensor;

a second operational amplifier amplifying the output signal of the vehicle loading sensor;

a third operational amplifier combining the output signals of said first and second operational amplifiers; and, a fourth operational amplifier receiving signals proportional to the signals detected by the sensors of the speed of rotation of the front-wheel and of the rear wheel.

4. A circuit as in claim 3, wherein said computer comprises:

an output line connected to the output of the third operational amplifier by the intermediary of a diode, said output line connected to the movable takeoff of the command potentiometer for the introduction of said first braking signal and to said second braking signal produced by said second means and to the output of the fourth operational amplifier via the series connection of a resistor, a Zener diode and a transistor.

* * * * *